No. 653,862. Patented July 17, 1900.
H. G. CLARK.
DRIVING GEAR FOR BICYCLES.
(Application filed Jan. 16, 1900.)
(No Model.)
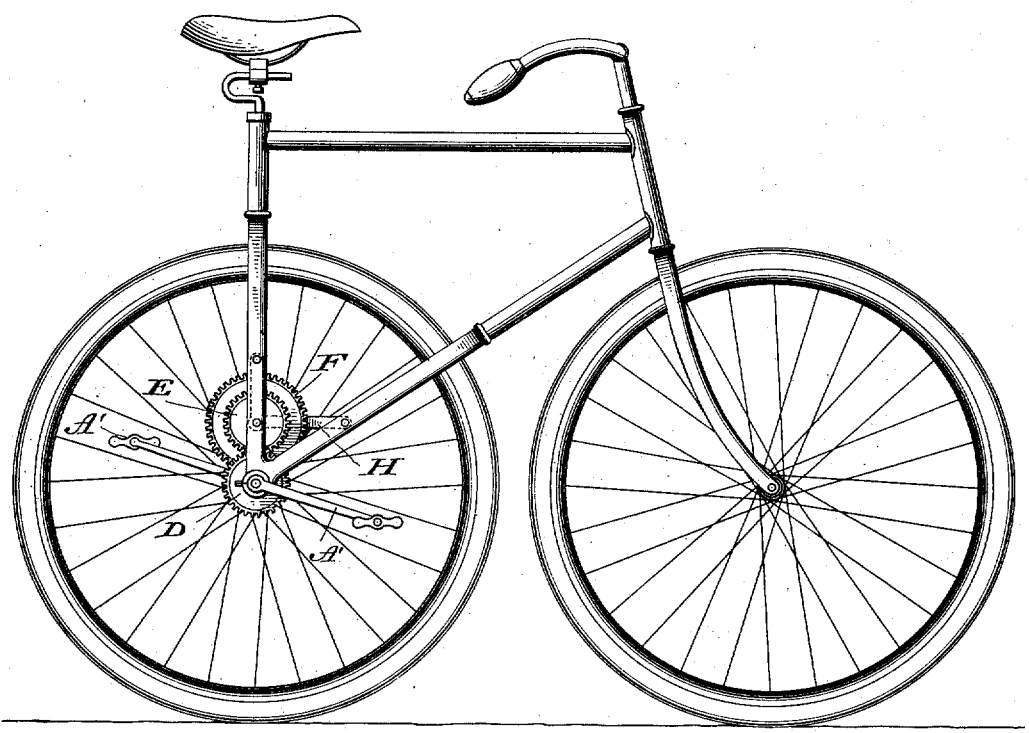
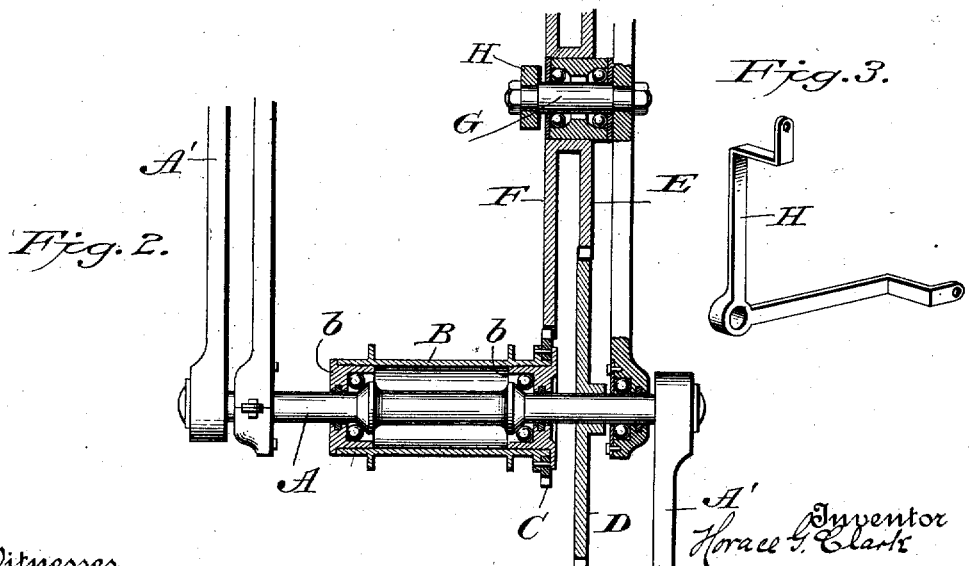
Witnesses
G. S. Elliott.
H. H. Johnson.
Inventor
Horace G. Clark
by Eugene W. Johnson
his Attorney

UNITED STATES PATENT OFFICE.

HORACE G. CLARK, OF GRINNELL, IOWA.

DRIVING-GEAR FOR BICYCLES.

SPECIFICATION forming part of Letters Patent No. 653,862, dated July 17, 1900.

Application filed January 16, 1900. Serial No. 1,650. (No model.)

*To all whom it may concern:*

Be it known that I, HORACE G. CLARK, a citizen of the United States, residing at Grinnell, in the county of Poweshiek and State of Iowa, have invented new and useful Improvements in Driving-Gear for Bicycles, of which the following is a specification.

This invention relates to certain new and useful improvements in driving-gear for bicycles; and it consists in the construction and arrangement of the parts, as will be hereinafter set forth, and specifically pointed out in the claims.

The object of this invention is to obviate the use of bevel-gears and chains now used in the propulsion of bicycles and substitute therefor gear or cog wheels which are so attached to the frame of the bicycle that they will revolve upon antifriction or ball bearings, the gearing being organized to occupy but little space and will be positioned where it will be protected from injury and can be readily inclosed by a casing when desired; and my invention consists in the particular construction and arrangement of the parts, as will be hereinafter set forth, and specifically pointed out in the claim.

In the accompanying drawings, Figure 1 is a side elevation of a bicycle constructed in accord with my improvement. Fig. 2 is a rear elevation, partly in section; and Fig. 3 is a detail perspective view of an angle-brace detached from the frame.

A bicycle constructed in accord with my invention can have, if desired, a wheel-base of less length by twelve inches than a bicycle which is geared in the usual manner, or the configuration of the frame may be varied to provide for a wheel-base of the standard length.

The lower portion of the frame, where the fork of the diagonal bar joins the fork of the mast or vertical bar, is provided with a suitable hanger having ball-bearings which engage and support a shaft A, which shaft is mounted to rotate in the hanger and be driven by the pedals A', said pedals being firmly attached to the ends of the shaft, which project beyond the frame. The shaft A carries between the frame a hub B, which turns freely upon the shaft, and said hub has ball-receiving cups $b$, the balls which are placed therein engaging with cones attached to or formed upon the shaft. The hub B has attached thereto the spokes, rim, and tire, as well as a gear-wheel C, which is rigidly connected to the hub. Upon the shaft A, between the hub and the frame, is a gear-wheel D, which is of larger diameter than the one on the hub and of the same diameter as a gear-wheel E, with which it meshes. The gear-wheel E is in rigid engagement with a gear-wheel F, the diameter of the latter being sufficient to mesh with the wheel C on the hub.

The gear-wheels E and F turn upon a rigidly-supported stub-shaft G, one end of which engages with the frame of the bicycle and the other end with an angle-brace H, which angle-brace has the ends of its arms bent toward the frame, so that said arms may be bolted or otherwise secured thereto, the arms overlying the gear-wheel F. The stub-shaft G may be provided with cones and the gear-wheels E and F with cups or bearings for antifriction rollers or balls. In a driving-gear constructed as shown it will be noted that the shaft or crank-axle A is turned in the same direction as the driving or rear wheel by the pedals and that the shaft carries a gear-wheel D, which imparts a movement to the gears E and F, which turns the hub in the same direction as the pedals or crank-shaft, but at a much higher rate of speed. The angle-brace is attached to the fork of the mast-bar and to the fork of the diagonal bar and not only supports the inner end of the stub-shaft, but may also be used to attach a casing (not shown) for the gear-wheels.

The gear-wheels E and F may be made integral with each other or from a single plate, which can be turned and cut to provide two toothed flanges.

The gear herein set forth is compact, light, and strong, and in use there is little friction.

The invention is susceptible of many modifications, especially as to the construction and arrangement of the bearings, and, if desired, treadles with clutches may be used instead of cranks, and, if used, the ends which are connected to the axle A will have clutches, and means, as a spring, will be provided for elevating the treadles after a downstroke has been imparted thereto. The shape of the frame shown admits of a construction which is lighter than the standard frame, and a wheel so constructed has a shorter wheelbase, and the rider is mounted almost directly over the driving-wheel.

I claim—

In a rear-driven bicycle, a crank-and-gear propulsion mechanism which includes a reverting train mounted on a driving-axle and upon a stub-shaft attached to one of the forks of the mast-post of the frame, in combination with an angle-brace having an eye for engagement with the inner end of the stub-shaft, each member of the brace being bent at right angles and again at right angles for attachment to the forks of the mast-post and reach of the frame, substantially as shown.

In testimony whereof I have hereunto set my hand in presence of two subscribing witnesses.

HORACE G. CLARK.

Witnesses:
T. M. PLUM,
S. D. CLARK.